United States Patent [19]

Allardice, Jr.

[11] 4,039,262

[45] Aug. 2, 1977

[54] CLAMP HOLDS MEMBERS IN ROTATABLY ADJUSTED POSITION

[75] Inventor: William D. Allardice, Jr., Pittsburgh, Pa.

[73] Assignee: Westinghouse Electric Corporation, Pittsburgh, Pa.

[21] Appl. No.: 701,396

[22] Filed: June 30, 1976

Related U.S. Application Data

[62] Division of Ser. No. 589,102, June 23, 1975, Pat. No. 3,995,201.

[51] Int. Cl.$^2$ .................................. F16D 1/12

[52] U.S. Cl. .................................. 403/110; 403/373; 74/10 R

[58] Field of Search .................. 403/110, 103, 83, 84, 403/373; 248/27.1; 74/10 R, 10.1

[56] References Cited

U.S. PATENT DOCUMENTS

| | | | |
|---|---|---|---|
| 2,206,467 | 6/1940 | Odin | 403/110 X |
| 2,661,173 | 12/1953 | Walser | 248/27.1 |
| 3,233,299 | 2/1966 | Godel | 248/27.1 X |
| 3,611,266 | 10/1971 | Amis et al. | 248/27.1 X |
| 3,965,755 | 6/1976 | Rosenberg et al. | 74/10 R |

*Primary Examiner*—Wayne L. Shedd
*Attorney, Agent, or Firm*—M. J. Moran

[57] ABSTRACT

A locking device is provided for a potentiometer dial and knob which are disposed on the front panel of a printed circuit board. There is a radial flange on the shaft of the potentiometer dial and knob. The base or non-turning portion of the potentiometer is fixedly disposed on the panel and is fixedly disposed on the printed circuit board. A pressure plate member having an opening therein is disposed around the rotatable shaft. The flange may thus abut the pressure plate to prevent substantial axial motion of the shaft which might cause the potentiometer base to be loosened from the printed circuit board. A movable locking member having an opening is disposed around the outer portion of the shaft so that the flange is disposed between the pressure plate and the locking member. There are second aligned openings in each of the locking member and the pressure plate through which a screw protrudes. The threaded base of the screw is rotatably disposed in a correspondingly threaded hole in the panel. As the screw is turned, the movable locking member is moved toward the flange thus pressing against the flange causing the flange in turn to be caught between the locking member and the pressure plate. This locks the potentiometer shaft at a fixed angular position. The lock and potentiometer may be utilized on a solid state control for an automatic transfer switch.

13 Claims, 10 Drawing Figures

CLAMP HOLDS MEMBERS IN ROTATABLY ADJUSTED POSITION

This is a division of application Ser. No. 589,102 filed June 23, 1975 now U.S. Pat. No. 3,995,201.

BACKGROUND OF THE INVENTION

This invention relates generally to a lock for a rotatable member the base of which is generally stationary and the rotational portion of which is disposed to be angularly moved through a relatively small angular range. This invention relates specifically to a locking device for the shaft of a panel mounted potentiometer including the dial knob and the like.

Axially adjustable locking members have been utilized with a flange on a rotating shaft to stop or prevent rotational movement of that shaft. One example of this is an automotive disk break. A disk breaking system is utilized to generally gradually provide a friction force to a rotating flange to cause the rotating flange to slow. In the field of electronics, panel mounted potentiometers and the like are provided with locking mechanisms. One type comprises a locking nut which is threaded around the shaft of a potentiometer. A screw driver is used to angularly adjust the position of the dial. With the potentiometer in the fixed angular position, the nut is turned with a wrench against the potentiometer base in such a manner as to provide radial pressure against the shaft to prevent further movement thereof. Since a nut is utilized, a wrench or similar means must be available for turning the nut into the locking position. In addition, since the nut is turned angularly and circumferentially around the shaft of the dial, there is always a possibility of causing the shaft to inadvertently rotate through a small angularly increment during the locking operation which of course is undesirable. In another kind of locking mechanism, a calibrated dial is provided which fits over the shaft of the potentiometer. The calibrated dial may be turned through a number of revolutions until a desirable angular position is reached in which case a small lever which is disposed on the casing of the calibrated dial may be circumferentially moved to lock the position of the dial. The small angular displacement of the lever may cause inadvertent bumping or touching of the dial during the locking operation or may cause slight movement of the shaft as the locking operation is completed. It would be advantageous to provide a potentiometer or similar rotational electronic device which has a turnable dial or handle which can be conveniently locked in a fixed angular position with minimal disturbance to the setting of the dial such as where the locking operation is predominantly axial to the potentiometer shaft rather then circumferential or radial to it. It would also be advantageous if this operation would not cause significant axial movement of the potentiometer during the locking operation which might cause the potentiometer to be torn away or loosened from the circuit support means upon which it is mounted or disposed.

SUMMARY OF THE INVENTION

In accordance with the invention, rotatable apparatus is lockable at a desired angular position. The rotatable apparatus comprises a base and a rotatable member which is disposed upon or in the base. The rotatable member is movable or rotatable to a predetermined angular position while the base remains stationary. There is a locking member disposed proximate to the base and to the rotatable member. The locking member is translationally movable relative to the base in direction to cause the rotatable member to be held generally immobile at the predetermined angular position. There is also provided a driving means for moving the locking member in the proper direction. In another embodiment the rotatable apparatus is similar to the previously described rotatable apparatus except that both the base and the locking member are translationally movable relative to each other to achieve a locked state. In another embodiment, a fixed member is disposed on a base (such as but not limited to a panel) and a rotatable member is disposed on or in the fixed member. The rotatable member is rotatable about an axis of rotation to a desired angular position. The rotatable member has a flange thereon which is spaced from the fixed member. There is also provided a pressure bearing member which is axially disposed in a fixed disposition relative to the base and relative to the flange to prevent significant axial movement of the rotatable member. This embodiment includes a movable locking member which is also disposed in an axial position relative to the flange. The flange member is disposed between the locking member and the pressure bearing member. The movable locking member is axially movable relative to the rotatable member to press the flange member against the pressure bearing member to prevent further rotation of the rotating member thus achieving a locked state. In another embodiment the rotational member is limited to rotation between 0 and 360 mechanical degrees. In another embodiment the base has a threaded opening therein and the locking member has a complementary opening therein through which a screw may protrude into the threaded opening of the base. The movement of the screw in the threaded base causes the locking member to move as described which ultimately locks the rotation member. In some of the previously mentioned embodiments the limitation of the rotatable member being rotatable to a generally predetermined angular position while the base remains generally stationary distinguishes over the disk break concept previously described. An advantage in this situation is that the rotatable member may be turned to a generally precised angular position and locked thereat by the locking member. Likewise another embodiment distinguishes over the disk break concept in that both the base and the locking member are translationally movable relative to each other. Further in other of the previously mentioned embodiments the limitation of a range of rotation between zero and 360° distinguishes over the concept of a disk break where rotation is generally through more than 360°. In another embodiment of the invention an electrical apparatus is called for providing an electrical circuit function in relation to an angular position of a rotatable portion of that apparatus. This embodiment comprises a base and a fixed member which is generally affixed to the base. There is a rotatable member disposed on or in the fixed member which is rotatable relative thereto. There is a flange which is provided on the rotatable member and a pressure bearing member which is disposed in a fixed disposition relative to the base and the flange member. There is a locking member which is movable axially relative to the rotatable member to cause the rotatable member to be locked or fixed after a predetermined desired angular position thereof has been attained. The axial movement of the locking member generally distinguishes over the calibration dial potentiometer with lever previously described where there is general rotational circumferential radial movement for locking. In the present embodiment the axial movement for locking is accomplished without significantly contacting the rotatable member. An advantage of the arrangement lies in the fact that once a precise angular position has been attained, the movement described in the present embodiment and other embodiments to be described later, generally does not tend to disturb that position. In still another embodiment the rotatable member is qualified as being a shaft and the movable locking member is qualified as being operable between two positions. In one position, the shaft is relatively free to move. In the second axially different position relative to the shaft, the shaft is generally locked. In still another embodiment electrical circuit apparatus is called for having a variable electrical function. There is provided a circuit apparatus means and a potentiometer connected in circuit relationship with the circuit apparatus means. The potentiometer has a stationary member and a rotatable shaft where the shaft is rotatable to cause an effect in the circuit apparatus. There is a panel which is interconnected with both the circuit apparatus means and the potentiometer stationary means. There is a flange on the shaft of the potentiometer and a pressure plate having a hole therein. The pressure plate is attached to the panel and the shaft is rotatable in the hole. The pressure plate prevents significant axial movement of the shaft in one direction relative to the panel. There is a movable locking plate which also has a hole in it and which is disposed on the other side of the flange from the pressure bearing plate. A screw is utilized in conjunction with a threaded portion of the base to cause the locking member to be moved toward the flange to thus lock the flange between the pressure bearing member and the locking member without significantly axially moving the shaft which would or might cause the potentiometer to be disjoined from the circuit apparatus means.

BRIEF DESCRIPTION OF THE DRAWINGS

For a better understanding of the invention, reference may be had to the preferred embodiments exemplary of the invention shown in the accompanying drawings in which.

DESCRIPTION OF THE PREFERRED EMBODIMENT

Figure 1:
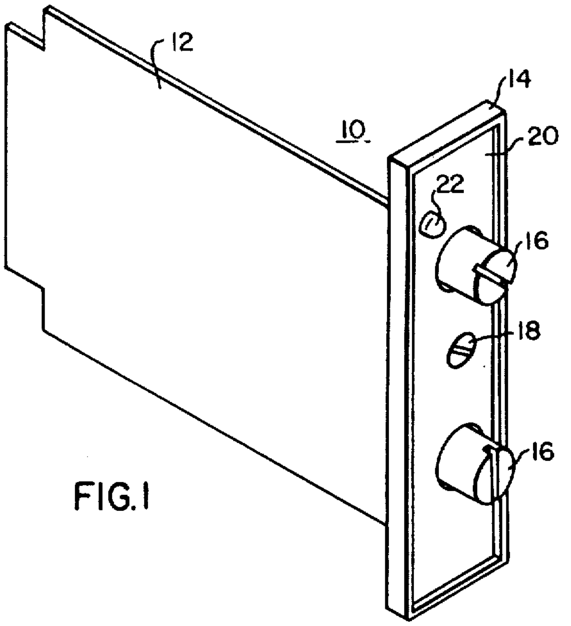
FIG. 1 shows a view of assembled circuit apparatus utilizing the teachings of this invention and FIG. 1A is a view of disassembled portions of the same apparatus.
Figure 1A:
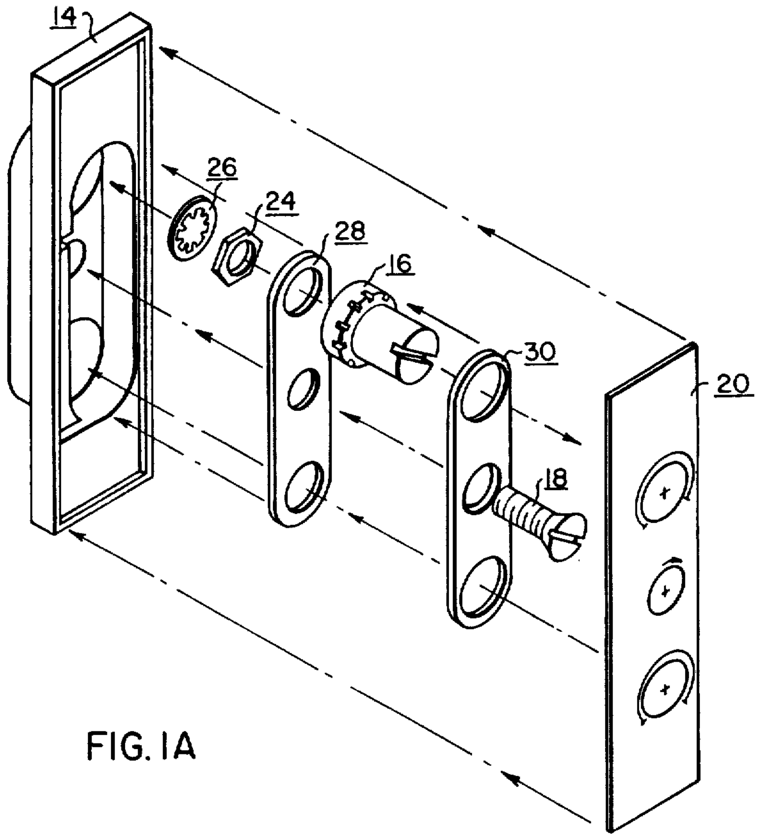

Referring now to the drawings and FIG. 1 in particular there is shown an electronic printed circuit board module of the plug-in type utilizing the concepts of this invention. The plug-in module is identified by the reference symbol 10. There is provided a circuit apparatus means or circuit support apparatus or printed circuit board 12 which is physically and electrically interconnected with a panel 14. The circuit board 12 extends at right angles outwardly from the back of the panel 14. In this embodiment there are provided two turnable or rotatable members 16 which may be turned through an angular range to a fixed generally predetermined angular position which is suitable for causing circuit functions to occur in the electrical apparatus of the circuit board 12. There is also provided a screw or driving means 18 which is utilized to lock the member 16 at a fixed angular position relative to the panel or base 14. Disposed on the front panel 14 is a printed legend card 20 which may be separably removable from the panel 14. The printed legend card 20 includes thereon among other things indicia for determining a fixed angular position for the knob or rotatable members 16. In this embodiment a light emitting diode or similar means 22 is shown on the front panel 14 for indicating the status of certain circuit functions on the board 12. The illumination of the lamp 22 may be the result of the particular angular setting of one or both of the potentiometer dials 16. Also shown in FIG. 1 is a disassembled view of some of the elements of the electrical circuit apparatus 10 of FIG. 1. Panel 14 is shown as well as the disassembled dial or knob 16 and the driving screw 18. The front panel legend sheet or card 20 is also shown. Elements 24 and 26 represent a nut and lock washer respectively for fastening the potentiometer base (not shown) to the panel 14. Elements 28 and 30 cooperate with the screw element 18 to provide a locking function for the dials 16. The element 28 comprises the pressure bearing member of the locking mechanism and the element 30 comprises the movable locking member of the locking mechanism.

Figure 2:
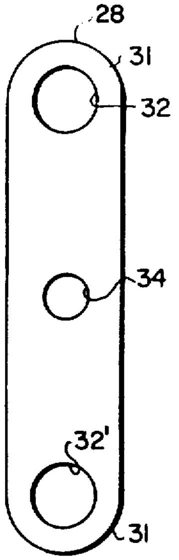
FIG. 2 shows a front view of a pressure bearing member.

Referring now to FIG. 2, the element 28 of FIG. 1 is shown in enlarged form. The element 28 may be defined as a pressure bearing member or plate. The pressure bearing member 28 comprises an elongated plate having arcuate ends at 31. Near each of the arcuate ends 31 are similar holes 32 and 32', one at each end of the plate 28. In the center of plate 28 is a screw clearance hole 34. A portion of the screw member 18 of FIG. 1 loosely fits through the pressure bearing plate 28 in the hole 34. The diameter of the hole 34 is sufficient to allow the screw member 18 to freely clear the pressure bearing member 28.

Figure 3:
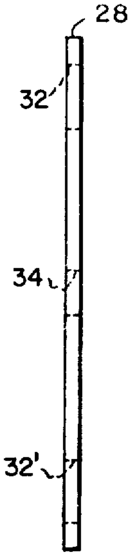
FIG. 3 shows a side view of the member of FIG. 2.

Referring now to FIG. 3, a side view of the pressure bearing member 28 of FIG. 2 is shown. The relative disposition, size and shape of the holes 32 and 32' and the screw clearing hole 34 are shown in side elevation.

Figure 4:
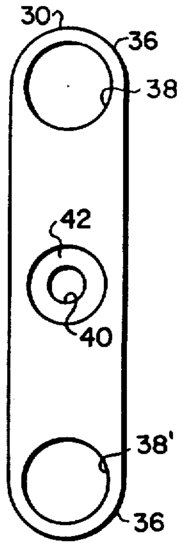
FIG. 4 shows a front view of a locking member.

Referring now to FIG. 4, an enlarged view of the movable locking member or plate 30 such as shown in FIG. 1 is shown. The movable locking member 30 is peripherally coincident in shape and size with the pressure bearing member 28. There are provided arcuate surfaces 36 for the ends of the locking member 30 which generally correspond to the arcuate surfaces 31 on the member 28. There are provided holes 38 and 38' in the locking member 30 which are generally concentric with the centerline of the holes 32 and 32' respectively of the pressure bearing member 28 of FIG. 2. The diameters of the holes 38 and 38' are larger respectively than the diameters of the holes 32 and 32'. There is also provided a central hole 40 in the member 30. The central hole 40 is generally concentric with the axes of the screw clearance hole 34 of member 28 and is such in size and shape to allow the screw member 18 to freely turn therein.

There is provided a countersunk surface 42 which is adapted for receiving the countersunk head of the screw 18 of FIG. 1.

Figure 5:
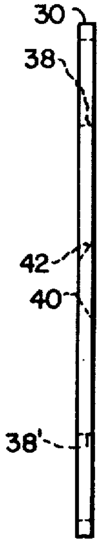
FIG. 5 shows a side view of the member of FIG. 4.

Referring to FIG. 5, a side view of the movable locking member or plate 30 with its first set of holes 38 and 38' and its second hole 40 is shown. The countersunk surface 42 is clearly shown in side elevation of FIG. 5.

Figure 6:
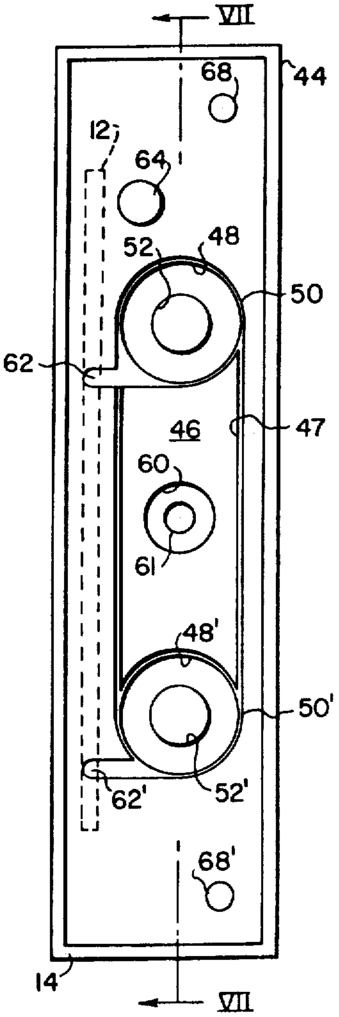
FIG. 6 shows a front view of the panel of FIG. 1.

Referring now to FIG. 6, a front view of the panel 14 of FIG. 1 is shown without the knobs 16, the light emitting diode 22 or the legend sheet 20. The panel 14 comprises a raised lip 44 which extends around the outer periphery of the panel 14. There is a central locking assembly region 46 which may have slightly canted sidewalls 47. At the upper end of the locking mechanism region 46 is a circular depression 48 which may also have slightly canted sidewalls 50. At the lower end of the locking mechanism region 46 is a similar circular depression 48' which may also have similar canted sidewalls 50'. There is provided in the center of the circular depression 48 a hole or opening 52 which extends through the panel 14. Similarly there is a central hole or opening 52' which extends through panel 14 at the region of the lower circular depression 48'. The equal radii of curvature of the circular depressions 48 and 48' correspond generally to the radii of curvature 31 and 36 respectively of the locking member 28 and 30 of FIGS. 2 and 4 respectively. The general shape of the locking mechanism region 46 is coincident with the general shape of the members 28 and 30. In the center of the locking mechanism depression 46 is a hole or opening which extends through the panel 14. Disposed in the hole 60 may be a bushing 61 or similar means which has an integral internal threaded portion. In this threaded bushing 61 the screw member 18 is turnable to provide a locking capability for the assembled electrical apparatus. At the upper and lower ends of the panel 14 may be holes 68 and 68' which are utilized for fastening purposes. There may be provided a hole 64 in which the light emitting diode 22 may be disposed. A portion of the front edge of the circuit card 12 is shown to the left of center of the panel 14 in outline. There are slots 62 and 62' in the panel 14 which are adapted to receive the circuit card 12 for securely mounting the circuit card 12 to the panel 14.

Figure 7:
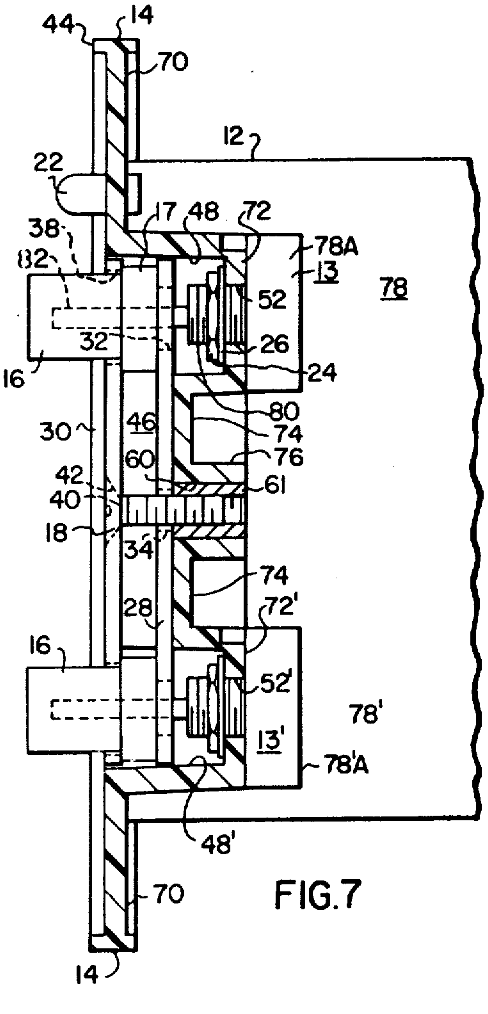
FIG. 7 shows a side view, partially in section, of the panel of FIG. 6 with a circuit board and potentiometers added.

Referring now to FIG. 7, a partial sectional side elevation of the panel 14 of FIG. 6 along the lines VII—VII is shown. In addition, a light emitting diode 22 as well as upper and lower potentiometer assemblies 78 and 78' and the locking mechanism comprising the members 18, 28 and 30 are shown in assembled relationship therein. The raised peripheral lip 44 of the panel 14 is clearly shown in the side view. Panel 14 comprises two relatively flat regions 70 abutting the ends of the locking mechanism depression 46. The circular depressions 48 and 48' are shown at either end of the locking mechanism region 46. The circular depression 48 has a bottom portion 72 and the circular depression 48 has a bottom portion 72'. The bottom of most of the remaining portion of the locking mechanism depression 76 is shown at 74. In addition, a backwardly extending portion 76 forms much of the remainder of the bottom of the locking mechanism assembly 46. The inner portion of this latter mentioned backwardly extending region 76 comprises the central hole 60 in which may be snugly inserted the internally threaded bushing 61. The printed circuit card 12 is shown extending rearwardly of the front panel 14. A potentiometer casing or base 78A for the potentiometer assembly 78 is securely attached to the printed circuit card 12 in the region 13. It is physically and electrically interconnected with the card 12. In a like manner, a potentiometer casing or base 78'A is physically and electrically interconnected with the printed circuit card 12 at the bottom of the printed circuit card 12 in the region 13'. An externally threaded fastening member 80 is disposed in the hole 52 and is securely fastened to the front panel 14 at the bottom 72 by utilizing the lock washer 26 and the locking nut 24 in the threaded engagement thereon. A shaft 82 extends axially on a common centerline with the potentiometer base 78A and the threaded anchoring portion 80. The shaft extends beyond the front of the panel 14. The shaft has securely attached or affixed thereto the dial and knob 16. The dial 16 may be considered to be part of the shaft 82 for the purposes of simplicity of explanation. A radial flange 17 which is larger than the remaining radial portion of the dial 16 is provided at the inward end of the dial 16. It may be said that this flange 17 extends outwardly radially from the shaft or rotatable member 82. The pressure bearing member 28 rests against a portion 74 of the panel or base 14. The centerline of the hole 32 of the pressure bearing member 28 generally aligns with the axis 82 of the potentiometer member 78 such that the axis 82 may freely turn in the hole 32 without abutting thereagainst. On the other side of the flange 17 and spaced from the member 28, is the movable locking member 30. The hole 38 in the movable locking member or plate 30 is sufficiently large to allow the diameter of the dial 16 to protrude therethrough without interrupting or affecting rotational movement thereof, but is not sufficiently large to pass over the flange 17. Consequently, the flange 17 is rotatably disposed between the movable locking member 30 and the relatively fixed pressure bearing plate 28. When the locking mechanism is in an unlocked state, the central hole 40 of the movable locking member 30 and the central hole 34 of the pressure bearing member 28 generally align with the internally threaded bushing member 61 such that the screw member 18 may protrude through all of the holes to be threadably engageable with the internal threads of the bushing member 61. The countersunk head of the screw member 18 abuts against the countersunk surface 42 of the movable locking member 30 to cause the movable locking member 30 to be moved to the back of panel 14 as the screw or driving means 18 is turned in the threaded bushing 61. The resulting diminution in spacing between the locking member 30 and the pressure bearing member 28 binds or frictionally secures the flange member 17 of the dial 16 to prevent further rotation thereof. Since the shaft 82 is fixedly attached or secured to the inner portion of the dial 16 further rotational movement of the potentiometer shaft is thus also precluded. For purposes of simplicity, the lower potentiometer 78' is shown without all the corresponding reference characters to its counterpart above as the locking operation is essentially the same as described with respect to the upper potentiometer assembly 78. It will be noted that the locking operation is essentially translational along the axis of the shaft 82, that is the locking movement is along the axis 82 from left to right as viewed in FIG. 7. In operation, the dial 16 is rotatably moved through a sufficient angular range to adjust the potentiometer setting to a generally precise predetermined value. This may be done by noting the angular disposition of the dial 16 or by noting an actual electrical effect. This may also be done for either or both of the assemblies 78 and 78'. When the proper dial settings or angular positions of the potentiometer dials or front knobs 16 have been achieved, a screw driver or similar turning means may be inserted into the slot in the countersunk head of the screw 18 and the screw 18 may be thus turned to cause movable locking plate 30 to move translationally to the right as viewed in FIG. 7. This binds the flange 17 between the movable locking plate 30 and the pressure bearing plate 28 thus preventing further rotational motion of the shaft 82. It will be noted that the disposition of the pressure bearing member 28 is such that the movement of the locking plate 30 will not tend to cause the entire potentiometer assembly 78 to move translationally. Repeated movements of this type could loosen the nut 24 and lock washer 26 to cause the potentiometer 78A to be torn away or separated from card 12.

Figure 8:
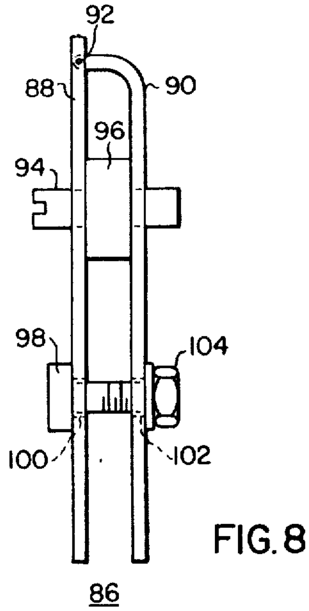
FIG. 8 shows another embodiment of the invention utilizing a hinged locking member.

Referring now to FIG. 8, another embodiment of the invention is shown in which a pressure bearing plate 88 and a hinged movable locking member 90 which is hinged to the plate 88 at pin 92 are utilized. In this embodiment a rotatable member 94 has a flange 96 which may be securely bound between the members 90 and 88 as the nut member or similar driving means 98 is turned in the bolt 104. The shaft of the bolt 98 protrudes freely through holes 100 and 102 in members 88 and 90 respectively.

Figure 9:
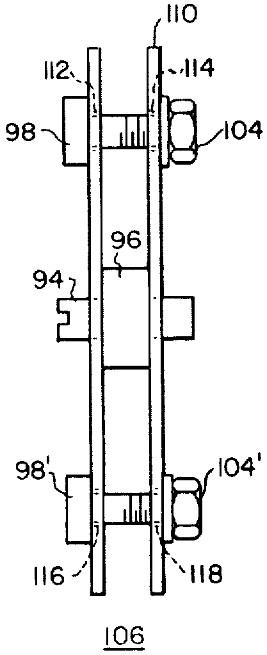
FIG. 9 shows another embodiment of the invention utilizing two driving means.

Referring now to FIG. 9 still another embodiment 106 of the invention is shown in which a single rotatable member 94 having a flange 96 is lockable or securable between plates 108 and 110 by utilizing two bolt and nut assemblies. There are aligned holes 112 and 114 in the upper portion of the plates 108 and 110 respectively through which the shaft of a bolt 98 protrude to be threadably engaged with a nut or similar means 104. Likewise at the bottom of the assembly 106 there are two axially aligned holes 116 and 118 in members 108 and 110 respectively through which a second bolt 98' may extend to threadably engage a nut or similar means 104'. When the proper angular disposition of the rotatable member 94 has been obtained, the nuts 98 and 98' may be threadably tightened in the bolts 104 and 104' respectively to cause the flange member 96 to be securely bound between the members 108 and 110.

It is to be understood with respect to the embodiments of the invention that the concept of this invention may be utilizable in rotatable apparatus lockable at a desired angle position or electrical apparatus for providing an electrical current function or electrical circuit apparatus having a variable electrical function. It is to be understood with respect to the embodiment of FIG. 7 of this invention that the movable locking member may be moved between a first position and a second position to cause the flange member 17 to be securely bound or fixed between the members 28 and 30. It is also to be understood with respect to the embodiment of FIG. 7 that the shaft 82 with its dial or knob 16 is rotatable in the holes 32 and 38 respectively when the locking member 30 is in the first position, and is not rotatable therein when the locking member 30 is in the second position. The lack of rotational capability after the locking member 30 has been placed in the second position is due to an axial pressure on the radial by extending sides of the flange 17 rather than a radially applied pressure to the shaft 82. It is also to be understood that the member 78A may be called a stationary or fixed member. It is also to be understood that the combination of the shaft 82 and the knob 16 may be alternately referred to as a rotatable means, a rotatable portion or a shaft. It is also to be understood that the rotational limitation for the shaft and dial may be generally unlimited in some embodiments and may be limited to between 0 and 360 mechanical degrees in other embodiments or further limited in still other embodiments. It is to be understood with respect to the embodiments of this invention that the embodiment of FIG. 7 generally shows the pressure bearing member 28 as being relatively fixed in regard to the base 14 while the movable locking member 30 may be translationally movable toward the base 14. However, in other embodiments of the invention, both the members 28 and 30 on either side of the flange 17 may move to cause the locking or securing of the flange 17 therebetween.

The apparatus embodying the concepts of this invention have many advantages. One of the advantages lies in the fact that a rotatable means may be securely locked without the necessity of applying radial pressure or friction directly against the shaft. In such a case the frictional pressure is applied parallel to the shaft. This has a tendency to reduce rotational movement of the shaft during the locking operation. Another advantage lies in the fact that the locking driving means is generally displaced from the shaft so that the turning of the driving means will not enhance inadvertent rotational movement of the knob or shaft member. Another advantage lies in the fact that the pressure plate described with respect to many embodiments of this invention prevents substantial significant axial motion of the apparatus to be locked thus preventing the tearing away, separating, or ripping away of the base of the apparatus from some object or base upon which it is disposed. Another advantage lies in the fact that the locking operation may be accomplished quickly with a minimum of effort. Another advantage lies in the fact that the operation may be accomplished by utilizing a screw driver rather than a wrench as is required in some locking operations. Another advantage lies in the relatively simple construction of the locking assembly. Another advantage lies in the fact that the relative surface area of the flange may provide increased locking pressure when compared with the locking pressure of radially applied locking force. Another advantage lies in the fact that the front surface of the apparatus shown in the embodiment of FIG. 7 is generally free of excessive protrusions other than the dials because of the disposition of the locking apparatus in a recess in the panel. Another advantage lies in the fact that replacement of the potentiometer apparatus of FIG. 7 in regards to the locking mechanism may be simply made. This apparatus will operate with one potentiometer and dial knob in either hole position — or with two potentiometers and dial knobs in place.

I claim:

1. Rotatable apparatus which is lockable at a desired angular position, comprising:

a. a base, b. a rotatable member disposed upon said base which is generally rotatable in a plane parallel to said base, said rotatable member being rotatable to a generally predetermined angular position while said base remains generally stationary, said rotatable member having a flange;

c. a locking member disposed proximate to said base and said rotatable member, said locking member being translationally movable to engage said flange when said rotatable member is at said predetermined angular position to lock it thereat; and d. driving means for moving said locking member.

2. Rotatable apparatus which is lockable at a desired angular position, comprising:

a. a base;

b. a locking member, said locking member and said base being translationally movable relative to each other;

c. a rotatable member disposed proximate to said base and said locking member, said rotatable member having a portion thereof disposed between said locking member and said base to be captured therebetween for general rotational immobilization thereof at a desired angular position when said locking member and said base are moved relatively closer together to a predetermined position and when said rotatable member is generally rotationally stationary; and d. driving means for causing relative motion between said base and said locking member.

3. Rotatable apparatus which is lockable at a desired angular position, comprising:

a. a base;

b. a fixed member which is generally affixed to said base;

c. a rotatable member which is disposed on said fixed member and which is rotatable about an axis of rotation to a desired angular position relative to said fixed member; said rotatable member being rotatable to said predetermined angular position while said base remains generally stationary;

d. a flange member which is disposed on said rotatable member and which is spaced from said fixed member;

e. a pressure bearing member which is generally disposed in a fixed disposition relative to said base and at an axial position relative to said flange member to generally prevent significant axial movement of said rotatable member relative to said base within limits;

f. a movable locking member and flange member, said flange member being disposed axially between said pressure bearing member and said movable locking member, said movable locking member being axially movable relative to said rotatable member to press said flange member against said pressure bearing member to thus generally prevent rotation of said rotatable member from said desired angular position; and g. driving means for moving said movable locking member in said axial direction.

4. The combination as claimed in claim 3 wherein said rotatable member is generally rotatable only through an angular range of between 0 mechanical degrees and 360 mechanical degrees.

5. The combination as claimed in claim 3 wherein said pressure bearing member is disposed between said flange member and said fixed member.

6. The combination as claimed in claim 3 wherein said base has a threaded opening therein, said locking member has an opening therein which is aligned with said threaded opening, said driving means comprising a screw which has a head portion and a threaded portion which is complementary to said threaded opening, said screw being disposed in said opening of said locking member and said threaded opening, said head portion being bearable against said locking member when said screw is turned in said threaded opening for thus moving said locking member in such axial direction.

7. Electrical apparatus for providing an electrical circuit function in relation to an angular position of a rotatable portion of said apparatus, comprising:

a. a base;

b. a fixed member which is generally affixed to said base;

c. a rotatable member which is disposed on said fixed member and which is rotatable about an axis of rotation to a desired angular position relative to said fixed member;

d. a flange member which is disposed on said rotatable member and which is spaced from said fixed member;

e. a pressure bearing member is generally disposed in a fixed disposition relative to said base and in an axial position relative to said flange member to generally prevent axial movement of said rotatable member relative to said base within limits;

f. a movable locking member also disposed in an axial position relative to said flange member, said flange member being disposed between pressure bearing member and said movable locking member, said movable locking member being axially movable relative to said rotatable member without significantly contacting said rotatable member to move said flange member against said pressure bearing member to thus generally prevent rotation of said rotatable member from said desired angular position; and g. driving means for moving said movable locking member in said axial direction.

8. The combination as claimed in claim 7 wherein said rotatable member is generally rotatable through an angular range of between 0 mechanical degrees and 360 mechanical degrees.

9. The combination as claimed in claim 7 wherein said pressure bearing member is disposed between said flange member and said fixed member.

10. The combination as claimed in claim 7 wherein said base has a threaded opening therein, said locking member having an opening thereon, which is aligned with said threaded opening, said driving means comprising a screw which has a head portion and a threaded portion which is complementary to said threaded opening, said screw being disposed in said opening of said locking member and said threaded opening, said head portion being bearable against said locking member to move said locking member axially when said screw is turned in said threaded opening.

11. Electrical apparatus for providing an electrical circuit function in relation to an angular position of a rotatable portion of said apparatus, comprising:

a. a base;

b. a fixed member which is generally affixed to said base;

c. a rotatable means including a shaft, said rotatable means being disposed in movable relationship with said fixed member, said shaft being rotatable about an axis of rotation to a desired angular position relative to said fixed member;

d. a flange disposed upon said shaft;

e. a pressure bearing member having an opening therein through which said shaft protrudes, said pressure bearing member being disposed between said flange and said fixed member in fixed relationship with said base to generally prevent significant movement of said shaft axially toward said base;

f. a movable locking member, having a hole therein through which said shaft protrudes, said flange being generally axially disposed between said locking member and said pressure bearing member, said shaft being movable through an angular range when said movable locking member is in a first position, said shaft being locked at a fixed angular position when said movable locking member is in a second position closer to said base than said first position; and g. driving means for moving said movable locking member between said first position and said second position.

12. The combination as claimed in claim 11 wherein said shaft is generally rotatable through an angular range of between 0 mechanical degrees and 360 mechanical degrees.

13. The combination as claimed in claim 11 wherein said base has a threaded opening therein, said locking member has a second opening therein which is aligned with said threaded opening, said driving means comprising a screw which has a head portion and a threaded portion which is complementary to said threaded opening, said screw being disposed in said second opening of said locking member and said threaded opening, said head portion being bearable against said locking member to move said locking member axially between said first and said second positions when said screw is turned in said threaded opening.

* * * * *